Oct. 15, 1957     H. S. CAMPBELL     2,809,701
CONTROL FOR HELICOPTER MULTIPLE SPEED TRANSMISSION
Filed April 14, 1952

INVENTOR
Harris S. Campbell

United States Patent Office 2,809,701
Patented Oct. 15, 1957

2,809,701

CONTROL FOR HELICOPTER MULTIPLE SPEED TRANSMISSION

Harris S. Campbell, Bryn Athyn, Pa., assignor to Eastern Rotorcraft Corporation, Doylestown, Pa., a corporation of Pennsylvania Application April 14, 1952, Serial No. 282,091

10 Claims. (Cl. 170—135.73)

This invention relates to helicopter control systems and is more particularly related to controls for changing the speed ratio of the transmission system which delivers power to the lifting rotor.

Helicopters are capable of flight under a great variety of air conditions including hovering flight, in which no transverse air flow occurs across the sustaining rotor, and high speed forward flight in which there is a large component of transverse air flow. The rotor blades therefore encounter a great variety of air flow conditions. A single speed of rotation must be a compromise for the extremes of the various conditions.

By providing a transmission system for delivering power to the rotor which incorporates two or more speed ratios, it is possible to increase the operating efficiency of the helicopter rotor, both during low speed hovering flight and under high forward speed flight conditions. During hovering conditions the best rotor efficiency is obtained by operating the blades at a relatively low tip speed and a high pitch angle. For high forward speed flight operation high tip speed for the rotor blades is desirable in order to overcome the tip stalling effect which occurs on the rotor blade when the ratio of forward flight speed to tip speed becomes relatively high. With a two speed transmission system a slow speed ratio can be provided which gives the best operating speed for hovering flight. This improvement in blade operation can provide approximately 10 percent greater lifting capacity during hovering over that of a rotor operating at a compromise speed. With such a two speed transmission system a shift to high speed may be made after some forward speed has been attained when the lifting capacity of the rotor is increased beyond that for hovering operation. The high speed gear ratio is selected to give the best operating efficiency for the rotor during high speed forward flight.

In operating a helicopter, particularly during the hovering and transfer from hovering to high speed flight or vice versa, it is desirable that the operator retain one hand on the flight control member and the other hand on the rotor pitch control and throttle member. Thus there is a problem of operating the transmission's speed ratio control while simultaneously retaining continuous control over the attitude and collective pitch control of the rotor. It is a primary object of the present invention to provide a suitable transmission shift control system to overcome this difficulty and allow the shift of the transmission ratio to be made while under power without requiring the operator to remove his hands from the flight and power controls.

A further object of the invention is the provision of mechanism in the shift control system to provide that the power shift can be made only when the proper flight pitch of the rotor blades is attained. This provision automatically prevents excessive speed change from occurring in the rotor and power system during the transfer from one ratio to another.

A further object of the invention is the provision of a shift control system which permits shifting the speed ratio automatically when the collective pitch reaches predetermined positions but which also permits the operation of the collective pitch control past these positions without having automatic ratio shift occur when such manipulation of the collective control lever is desired.

How the foregoing primary objects and other secondary objects of the invention are accomplished will be clear from the following description of the drawings in which—

Figure 1:
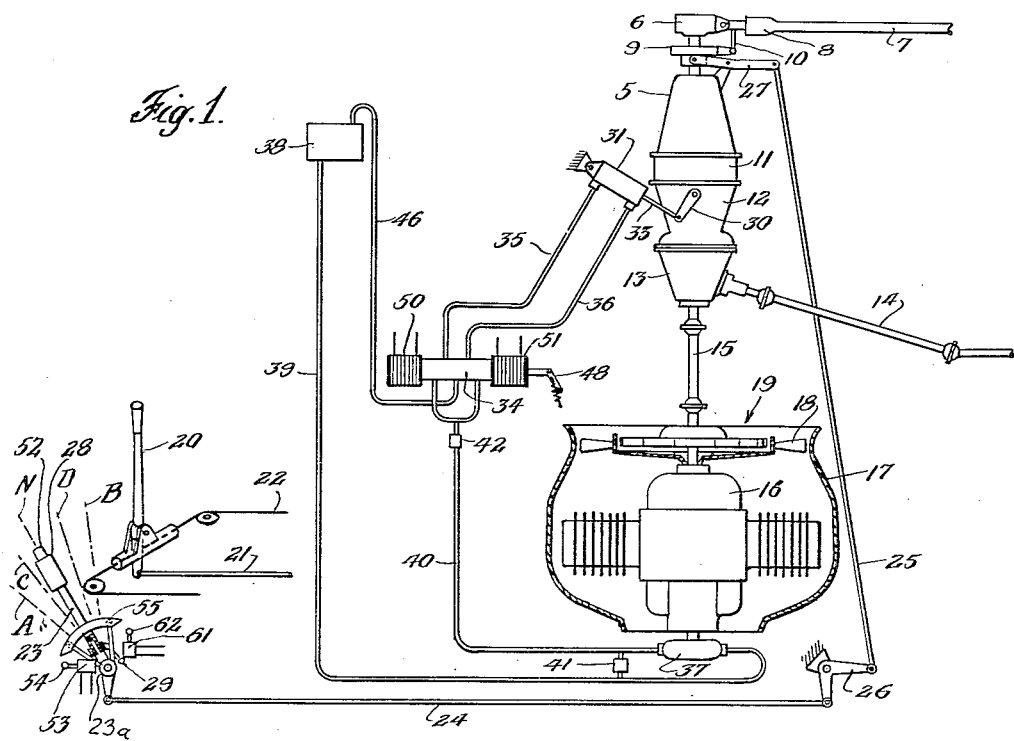
Figure 1 is a side elevational view showing the essential parts of the helicopter drive system and control system incorporating the present invention.

Referring to Figure 1, it will be seen that rotor hub unit 5 incorporates a rotating hub portion 6 to which is attached a plurality of blades, one of which is illustrated at 7. Blade 7 is mounted for pitch control by means of a suitable pivot mounting, the bearings of which are enclosed in a blade root housing 8. A swash plate 9 is used to control the pitch of the rotor blades and push rod 10 transmits the control motions from the swash plate 9 to the blade 7.

The rotor is driven through a transmission which provides for reduction from the engine speed by means of a main gear reduction unit which is illustrated at 11. The transmission also incorporates a two speed ratio change unit 12 having further gearing and control mechanism for effecting the speed change. This two speed mechanism is not shown in detail but may take one of the forms illustrated in my co-pending U. S. application, Serial No. 17,707, filed March 29, 1948, now Patent No. 2,771,143, issued November 20, 1956.

Below the two speed portion of the transmission there is the power take off unit 13 from which the tail rotor drive shaft 14 extends to provide the drive for the directional control rotor of the helicopter. An input drive 15 transmits the power from the engine 16 to the transmission.

Engine 16 is provided with a cowling 17 and a cooling fan 18. Inside the periphery of cooling fan 18 there is a centrifugal clutch unit illustrated by the numeral 19. Clutch 19 may be of orthodox construction since such clutches are well known in the art and provide for the engagement of the engine to the rotor drive after the engine has reached a predetermined operating speed. An overrunning clutch is included in the drive to permit the rotor to operate in case of sudden engine failure.

Attitude control of the helicopter is maintained by operation of the control stick 20 which actuates push rod 21 and cables 22 to provide for longitudinal and lateral control of the craft. These controls may be connected to the swash plate 9 in any suitable manner to provide for tilting action and thereby produce cyclic pitch control of the rotor blades. The collective pitch control of rotor blade 7 is accomplished by movement of a lever 23 which actuates push rods 24 and 25 and the bellcrank 26. Lever 27 which is connected to push rod 25 moves the swash plate unit 9 in a vertical direction to provide the collective control action. Movement of the control lever 23 from extreme position A to extreme position B provides for full operating range of pitch control. This range may be from zero lift pitch or less while the craft is on the ground to a maximum of 18° or more depending upon the characteristics of the particular airfoil being used. The pitch control lever 23 is normally equipped with a rotatable handle grip 28 which is connected with suitable linkage such as by external lever 29 to the throttle control of the engine 16. This general throttle control system is a common one in helicopters inasmuch as it permits full control of the engine speed without the need for the operator removing his hand from either the attitude flight control stick 20 or collective control stick 23.

Figure 2:
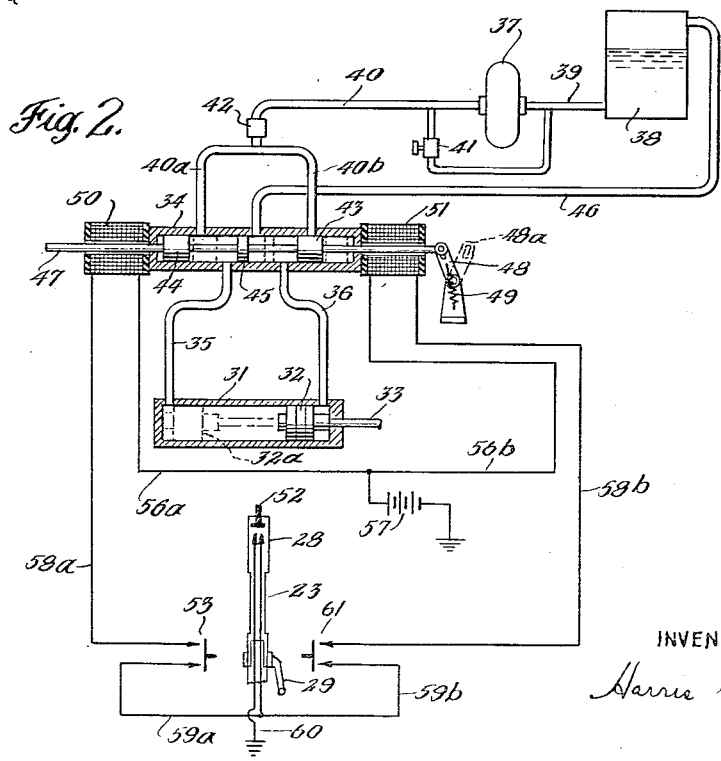
Figure 2 is a diagram of electric and hydraulic controls for actuating the system shown in Figure 1.

The mechanism for actuating the two speed gear ratio change is also illustrated in Figure 1. A shift control lever 30 actuates the clutch in the two speed unit 12 which produces the ratio change while the transmission is operating. This lever 30 is actuated by means of a hydraulic cylinder 31. The shifting mechanism is also illustrated in diagrammatic form in Figure 2 where it will be observed that a double acting piston 32 is mounted in cylinder 31 and is connected to the lever 30 by means of piston rod 33. A hydraulic connection is supplied to each end of the cylinder 31 to connect it to the control valve unit 34. These hydraulic connections are illustrated by tube 35 which connects to the one end of the cylinder and tube 36 which connects to the other end. In order to supply pressure for actuating the cylinder 31, a pump 37 is used, this pump being normally driven by the engine or other source of power. For example, the pump may also be driven by connecting it to the transmission unit so that power for the pump is available at all times even when the engine is not operating. Such an arrangement for a pump drive has been used in prior constructions such as those in which the pump is used for rotor governor purposes. In this case the same source of supply is suitable for clutch operation. However, an engine driven pressure supply, as disclosed in Figure 1, is satisfactory for clutch operation inasmuch as upon engine failure it is immaterial whether the transmission is operating in one ratio or the other. Reference to Figures 1 and 2 will indicate that the pump 37 is supplied with fluid from the reservoir 38 by means of pipe 39. Delivery of pressure from the pump to the control valve is through line 40, a by-pass or regulator valve 41 being used to control the pressure at a pre-determined value. Pressure regulator valve 41 incorporates an adjustment to permit setting the valve to the desired value. Pressure from line 40 is delivered to the control valve through two branches 40a or 40b. Also a check valve 42 is preferably installed in line 40 in order to retain cylinder 31 at whichever position it happens to be should failure of pressure occur due to loss of power or for any other reason.

The control valve 34 is illustrated as a multiple piston sliding valve but it will be obvious that the same type of control of pressure to either end of the cylinder 31 may be obtained with other forms of valve. The present valve is shown for the purpose of illustrating the type of operation desired. With the valve in the position illustrated in full lines, the right-hand piston member 43 is in position to close pressure branch line 40b while the left-hand piston member 44 is moved to extreme position where it opens pressure line 40a to the interior chamber formed between the left-hand piston and the center piston member 45. In this position pressure is admitted to line 35 leading to the cylinder 31 at the left end opposite piston rod 33. Line 36 leading from the cylinder at the end adjacent piston rod 33 leads to the chamber formed between right-hand piston 43 and center piston 45 and connects with low pressure line 46 leading to the reservoir 38. Rod 47 which extends through the valve is connected at one end with a toggle device 48 which includes spring 49. In the extreme position shown the spring 48 is beyond dead center on the side which holds the valve against accidental displacement from the full line position. When the valve is moved to the opposite position, namely, to that shown by the dotted outline of the valve parts, the toggle device 48 moves to dotted position 48a when the spring 49 is at the opposite side of dead center to retain the valve in this position. With the valve moved to this dotted position, right-hand piston 43 has moved to open the line 40b while the left-hand piston has moved to position to close pressure line 40a. The center piston 45 has moved to dotted position to form a pressure chamber leading from pressure line 40b to line 36 which leads to the right-hand end of the cylinder 31. The line 35 leading from the opposite end of the cylinder is then opened to the low pressure chamber which connects to return line 46, thus providing for movement of the piston 32 to the opposite end of the cylinder 31 as indicated by position 32a. By this movement of the piston 32 the lever 30 is moved to cause shift of the speed ratio.

In order to control the shift while maintaining the other controls of the helicopter and also to coordinate the control of the clutch with the proper relative blade pitch setting, suitable connections are provided between the collective control pitch lever 23 and the valve unit 34. For convenience, an electrical system may be used to provide a proper relationship of manual pitch lever position and the two speed clutch. This electrical system is illustrated in Figure 2 where it will be seen that solenoids 50 and 51 are used, one at each end of the valve 34, to produce the desired shifts in valve position. In the full line position of the valve the clutch has been moved to provide for high speed operation of the rotor such as during high speed forward flight. Under these conditions the collective pitch lever 23 will normally be in a relatively low pitch position approximately as illustrated in position C. In order to produce actuation of the valve to move it to the position illustrated, it is necessary that the switch button 52 located at the end of the control stick 23 be depressed and simultaneously the control stick should be moved to position C to actuate switch 53. Switch 53 is illustrated as a plunger type switch and has a roller 54 in the terminal of the plunger. The switch is actuated by contact with the arcuate member 55 which moves with the lever 23 since it is attached to the shaft 23a to which lever 23 is connected. The lower surface of the arcuate member contacts roller 54 to cause energization of the switch. The circuit involved is illustrated in Figure 2 where it will be seen that conductor 56a leads from battery 57 to solenoid 50 and conductor 58a leads from solenoid 50 to switch 53. Conductor 59a leads from switch 53 to switch 52 and conductor 60 leads from switch 52 to ground or return. From this circuit it will be seen that both switch 52 and switch 53 must be closed in order to provide a complete circuit for the energization of solenoid 50. Thus when it is desired to shift the speed ratio to the position shown, the button 52 may be depressed by the operator and at the instant it is desired to make the shift the pitch lever is moved down to position to contact switch 53. With the lever 23 at position C the rotor blade pitch angle is proper for absorbing the engine power at the increased rotational speed produced by the ratio change. Thus there will be minimum fluctuation in engine speed after the speed change since the proper conditions have been produced for the new rotor speed by the movement of the pitch lever to the position C to cause completion of the electrical circuit.

Shift to low speed or hovering ratio is made in similar fashion to that described above by completing the necessary circuits to energize solenoid 51. Solenoid 51 is connected by leads 56b and 58b to the battery 57 and to switch 61 respectively. Conductor 59b connects switch 51 with the pitch lever switch 52. Conductor 60 then provides a completion of the circuit to cause shift.

Shift to low speed position is made by first depressing switch button 52 to prepare the system for shift. Since the rotor is operating at high speed ratio an intermediate pitch setting will be in use, in the range from normal position N to slightly below position C. The proper blade pitch for low speed (hovering) operation with full power corresponds to lever position D. Movement of the lever 23 to this position causes arc member 55 to contact roller 62 and close switch 61. Thus, since switch 52 is also closed, the circuit to solenoid 51 is completed, thereby causing movement of the valve to dotted line position. The speed change to low speed is thus completed by the movement of piston 32 which operates clutch lever 30. As soon as the shift has taken place the operator may release button 52 and the pitch lever 23 may be moved to any position desired for control purposes. Thus movement to maximum pitch position B or minimum position A is permissible since any speed ratio change requires the closing of both manual switch 52 and position switch 53.

The importance of the proper relation between blade pitch and transmission ratio at the time of a shift will be more clearly understood when it is considered that blade pitch and rotor R. P. M. both have a definite effect upon power required. Thus if the rotor is operating in low speed ratio the engine will be delivering close to full power with high pitch on the blades. Should a change in ratio to high speed rotor operation be made (for example, of the order of 1.3 to 1) the rotor instead of turning say 200 R. P. M. should increase to $1.3 \times 200 = 260$ R. P. M. for the same engine speed. With a constant blade pitch the power requirements will vary approximately in proportion to the cube of the velocity. Thus the power required after the shift would be approximately $1.3^3$ or over twice the power. Since the engine was already operating at close to full power the increase in load would reduce the engine speed to marked degree resulting in reduced power output. By reducing pitch of the blades at the same time that the speed ratio is changed the blades are permitted to speed up to the 260 R. P. M. and the full power is absorbed at the new rotor speed. Only a slight momentary engine speed reduction will occur with immediate stabilization under the new conditions. The throttle may be opened slightly to give an increase in power for this new condition of operation.

Likewise for the reverse change when the transmission is shifted from high speed ratio to low speed ratio it is necessary to increase the blade pitch simultaneously with the shift. Otherwise a dangerous overspeeding of the engine would occur. But with the blade increase the rotor is loaded so that it almost instantly slows down to the speed corresponding to normal engine speed and provides for absorbing the proper power to provide a stabilized operating condition. To correct for the slightly less power required after the shift throttle 28 may be closed a small amount.

It will be evident that with the control system as disclosed for the multiple speed transmission, the operator may change speed ratios when desired without removing his hands from the normal flight controls or the engine throttle control. Thus the operator is always in position to control for any flight or power change needed. Position switches are used to assure proper relationship between the rotor pitch and the transmission speed at the instant of shift. However these switches do not prevent full range normal operation of the pitch control because they are effective only when operated in conjunction with the manual switch on the pitch lever. The position switches assure that the operator cannot inadvertently operate the gear shift at a detrimental blade pitch where dangerous over or under speeding of the rotor might occur due to sudden change in power requirements. With this control system full advantage may be taken of the improved performance available by the use of a multiple speed helicopter transmission.

I claim:

1. A helicopter having a lifting rotor including a blade and pitch change mechanism, a pitch control member connected to said mechanism, a transmission connected to said lifting rotor having provision for transmission of power under at least two different speed ratios, mechanism connected to said transmission for shifting from one speed ratio to the other, a system for controlling said shifting mechanism including a power source, a device connected with said shifting mechanism and said power source, power control elements connected to said device including an electrical switch element connected for operation by said pitch control member when it is moved to a preselected position, a second switch element, being manually operable, said elements being interconnected in series to effect delivery of power to said actuating device only when both of said elements are operated simultaneously.

2. A helicopter having a lifting rotor including blades mounted on said rotor, collective pitch change mechanism, an operator's collective pitch control connected to said blades, a transmission system connected to said lifting rotor, said transmission incorporating a plurality of operating speed ratios, shift control mechanism connected to said transmission, operating controls connected to said shifting mechanism including an electrical system having a switch connected to the collective pitch control at a preselected position and a second switch manually controlled by the operator, said switches being connected in series so that both must be actuated simultaneously in order to cause a shift in the transmission ratio.

3. For a helicopter, a sustaining rotor having blades and a pitch mounting therefor, a control lever having connections to said blades for controlling the pitch of said blades, a power plant, a transmission between said power plant and said rotor incorporating at least two speed ratios, controllable mechanism connected to said transmission for shifting from one ratio to another, said mechanism including a power actuated device, a manual control switch element mounted on said lever and another control switch element connectible to said lever and actuated by pitch control movement thereof, electrical interconnections between said elements and said power actuated device arranged to deliver power to said device only when both said elements are actuated simultaneously.

4. A helicopter having a rotor incorporating a blade and pitch change mounting parts, a collective pitch lever connected to said blade, a power plant, a multiple ratio transmission between said power plant and said rotor, mechanism connected to said transmission for changing the ratio thereof including a hydraulic actuating cylinder, a pump, an electrically operated valve controlling pressure to said cylinder and a control switch for said valve located on said pitch lever, and electrical operating connections between said valve and said switch, said electrical connections including a breakable circuit actuated by said lever.

5. A helicopter having a rotor including blades and pitch mounting parts, a collective pitch lever with connections to said blades, a power plant, a multiple ratio transmission between said power plant and said rotor, ratio changing mechanism connected to said transmission including a hydraulic actuating cylinder, a pump, a valve controlling pressure to said cylinder, and an electrical control having connections to said valve including a switch on said pitch lever and a second switch operated by said lever when it is moved to a predetermined position.

6. For a helicopter having a rotor including a blade and pitch change mounting parts, a blade pitch control member connected to said blade, an engine, a two speed transmission with connections for delivering power from the engine to the rotor, control mechanism connected to the transmission for shifting from low speed to high speed and vice versa, said mechanism including an element having connections to the control member located to be actuated when said member is moved to the position which gives the blade pitch suited for high speed rotor operation and a second element having connections to the control member located for actuation upon movement of the pitch control member into position to give suitable low speed blade pitch and a third element having series connection with each of said other elements.

7. For a helicopter having a rotor including blades and blade pitch change mounting parts, a blade pitch control member connected to said blades, an engine, a two speed transmission having connections between the engine and the rotor, control mechanism connected to the transmission for shifting from low speed to high speed and vice versa, said mechanism including an electrical switch having mechanical connections to said pitch control member actuated when said pitch control member is moved into position to give suitable high speed blade pitch, a second electrical switch having mechanical connections to said pitch control member actuated upon movement of said pitch control member to position to give suitable low speed blade pitch, a manual electrical contact element located on said pitch control member and electrical interconnections providing for electrical conduction through either of said switches only when said manual contact element is actuated.

8. For a helicopter having a rotor including blades and pitch change mounting parts, a blade pitch control member connected to said blades, an engine, a two speed transmission connected to the engine and the rotor, control mechanism connected to the transmission for shifting from low speed to high speed and vice versa, said mechanism including a hydraulic cylinder, a pump, a solenoid operated valve for controlling delivery of pressure from said pump to said cylinder, a manual switch mounted on said pitch control member, a position switch having connections to said control member actuated upon movement of said control member to position for suitable high speed rotor blade pitch, a second position switch having connection to said control member actuated upon movement of said control member to position suitable for low speed rotor blade pitch and electrical connections between said manual switch, said position switches and said valve providing for movement of said solenoid valve only when one of said position switches is operated in conjunction with said manual switch.

9. A helicopter having a lifting rotor, an engine, a multiple ratio transmission connected to said engine and said rotor, ratio shift mechanism connected to said transmission including a double acting piston, a two-position control valve, hydraulic connections between said piston and said valve, two solenoids having a mechanical connection to said valve, retention mechanism contacting said mechanical connection to hold said valve in either of its two positions against accidental displacement, a manual electrical switch having electrical connections to said solenoids thereby providing for shift of the valve position by momentary energization of a valve solenoid.

10. For e helicopter having a rotor including a blade and pitch change mounting parts therefor, a blade pitch control member connected to said blades, an engine, a two-speed transmission connected to the engine and rotor, control mechanism connected to the transmission for shifting from low speed to high speed and vice versa, said mechanism including an electrically controlled power unit, a manually operated switch mounted on said pitch control member, a switch device with connections to said power unit to control the low speed operation, another switch device with connections to said power unit to control the high speed operation, electrical connections between said control member switch, said power unit and said switch devices giving series operation of said control member switch and each of said switch devices to provide for operation of said power unit only when one of said switch devices is actuated in conjunction with said control member switch.

References Cited in the file of this patent

UNITED STATES PATENTS

| 2,217,364 | Halford et al. | Oct. 8, 1940 |
| 2,317,341 | Bennett | Apr. 27, 1943 |
| 2,365,204 | Martin et al. | Dec. 19, 1944 |
| 2,428,128 | Sheppard | Sept. 30, 1947 |
| 2,517,150 | Webb | Aug. 1, 1950 |
| 2,551,067 | Stanley | May 1, 1951 |

FOREIGN PATENTS

| 460,149 | Great Britain | Jan. 19, 1937 |